March 7, 1933. A. LEIB 1,900,292
DIRECTION FINDER APPARATUS
Filed April 20, 1929
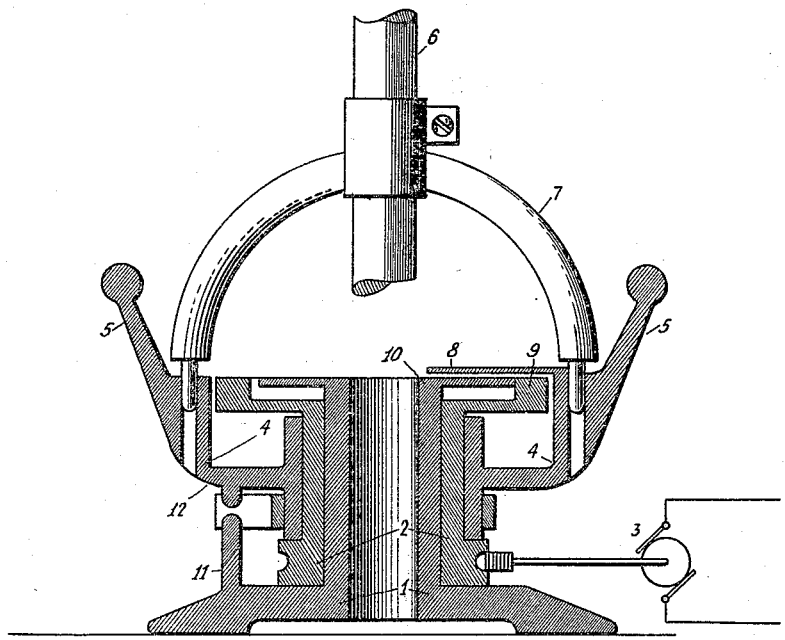
INVENTOR
AUGUST LEIB
BY
ATTORNEY Patented Mar. 7, 1933

1,900,292

UNITED STATES PATENT OFFICE

AUGUST LEIB, OF BERLIN, GERMANY, ASSIGNOR TO TELEFUNKEN GESELLSCHAFT FÜR DRAHTLOSE TELEGRAPHIE M. B. H., OF BERLIN, GERMANY, A CORPORATION OF GERMANY

DIRECTION FINDER APPARATUS

Application filed April 20, 1929, Serial No. 356,652, and in Germany May 5, 1928.

Radio direction finders of the kind heretofore used on sea and aircraft are provided with directional antennæ or goniometers whose supports or bearings are built stationary in the craft or vessel. This often involves the disadvantage that the directional part of the goniometer, as the ship is turned in rough weather or during changes in the course of the vessel, must be re-adjusted in the direction of bearings against the sense of turning of the vessel. This re-adjustment is time-consuming and difficult especially where accurate and sensitive rotary-coil goniometers are concerned.

This drawback is obviated according to the present invention by that the directional antenna or the goniometric parts of the driving means are so coupled with a compass that the directional part of the goniometer, once set to the proper bearings, will be automatically retained in this proper direction by action of the compass.

One exemplification of the invention is explained in more detail in what follows by reference to the accompanying drawing, in which the single figure shows an embodiment of my invention.

Referring to the drawing, 1 denotes a cylindrical member terminating at one end in a base member adapted to be rigidly supported on the ship's structure and at the other end in a scale member 10 which may carry indicating lines or markings as for instance lines denoting the ship's lubber line and a line at right angles to the first named line. Mounted for rotation on the cylindrical portion of base member 1 is a sleeve 2 which terminates at one end in gearing means whereby it may be driven and at the other end in a compass card 9 on which the various points of the compass are placed. The member 2 is adapted to be driven in synchronism with a master compass, as for instance, the ship's master compass through gearing means driven by an electric motor 3 which in turn is driven in synchronism with the master compass. In this manner the compass card 9 is caused to continuously follow the movements of the pointer on the main master compass. The means for supporting the radio compass will now be described. The support for the radio compass includes a member 4 mounted for rotation on the member 9. In order that the member 4 will normally rotate with the member 2 but may be rotated relative to the member 2 when desired, the drive between the member 4 and the member 2 is effected through a yielding frictional surface. This drive, while normally effective to drive the member 4 with the member 2 allows the member 4 to be rotated manually relative to the member 2 by means of a hand wheel 5 integral with the member 4. The radio compass, that is, the directive aerial is mounted on a shaft 6 which is in turn supported by a fork member 7 which is in turn rigidly supported as shown in openings in the member 4. Mounted on the member 4 is a pointer 8 which on simultaneous rotation of 4 and 2 moves relative to the indicator surface 10 only and on rotation of 4 relative to 2 moves with respect to 10 and also with respect to compass card 9. While the member 4 has been shown as being manually rotatable by hand wheel 5 it will be understood that rotation thereof may be effected by means of a rope drive or any other well known drive. Furthermore, it will be understood that the relative positions of the various elements in the apparatus may be changed without departing from the scope of the invention since the present form has been shown merely for purposes of illustration.

In order to prevent the leads between the directive aerial and the receiver from being twisted off due to continuous rotations of the shaft 6 stop members 11 and 12 integral with base 1 and member 4 respectively cooperate with the extension on a collar 13 rotatably supported on the member in a well known manner to prevent the shaft 6 and member 4 from being rotated more than 360 degrees in one direction. This in turn prevents the leads between the directional aerial and the receiver from being disrupted. The stop member 11 and collar 13, however, do not prevent the compass card 9 from being maintained at all times in a position similar to the position of the main magnetic compass since as pointed out above the member 4 is driven by means of the member 2 through a yielding friction drive.

In operation, the radio compass is moved into a position pointing toward the stations to which it is tuned. If the ship deviates from its course in any direction, the magnetic compass will always swing to a position pointing toward the north pole. The compass card 9 being driven in synchronism therewith will likewise take up a similar position, that is, maintain its pointing position at all times. Since the radio compass is normally driven by means of the member 2 which drives the compass card 9, the radio compass will likewise be maintained in the position or substantially in the position in which it is last manually placed, i. e. pointing toward the sending station. Or in other words, the loop antenna of the radio compass will be kept at substantially a constant angular relation with the direction of the transmitting beacon, providing the relative distance between the receiving station or vessel and the transmitting beacon is comparatively great and the travel of the receiving station comparatively normal. If, however, the distance between the receiving station on the vessel and the transmitting beacon on the shore is relatively small, compared with the travel of the vessel, then the angular relation between the transmitting beacon and the radio compass loop will not remain constant. In operation, therefore, after the radio compass is manually positioned to point towards the station to be received, it will be maintained substantially in such position until moved to another position manually. The advantage in this is that it is not necessary for the operator to be continuously rotating the radio compass as the ship is swung off its normal course since it is automatically maintained in position.

Since the vessel and its superstructures tend to deviate the directional radiations, an uncompensated goniometer outfit by the aid of pointer 8 would not allow of giving directly correct readings of direction, indeed, it would be necessary first to ascertain the necessary corrections and to take them into account in making readings. In order to save this loss of time, it is advisable to use an outfit as here disclosed always in combination with a compensating device adapted to correct or eliminate such deviations in the directional beam as are occasioned by the vessel. It is then possible to read directly with pointer 8 upon the compass scale 9 the proper bearings, and upon ship dial or scale 10 the correct ship goniometer indications.

I claim:

1. Directional finding apparatus for marine and aircraft including, a radio compass, a magnetic compass, and means actuated by said magnetic compass for automatically imparting to said radio compass movements equal to the movements of said magnetic compass.

2. A radio direction finder for marine and aircraft use comprising a radio loop aerial mounted for rotation, a master compass arranged to operate a compass scale, said radio loop aerial being mounted adjustably with respect to said compass scale, and means for coupling said master compass with said radio loop aerial for simultaneously rotating said loop aerial so that the loop aerial will automatically be set to receive a certain transmitter once said loop aerial is adjusted to said transmitter.

3. Directional finding apparatus for use on marine and aircraft which carry a master compass or equivalent instrument, said apparatus comprising a radio compass having a loop aerial, a pointer rotatable directly with said loop aerial, a radio compass scale, means for causing said radio compass scale to assume positions identical with the position taken by said master compass, and coupling means between said radio compass scale for simultaneously moving said loop with said radio compass scale and said master compass.

4. A directive radiant energy responsive means comprising a loop aerial mounted for rotation, a master compass arranged to operate a compass scale, engaging means with said master compass so that there is direct coupling between said radiant energy responsive means and the compass scale so that the master compass will automatically retain the radiant energy responsive means substantially set to receive a certain transmitter once said radiant energy responsive means is adjusted to said certain transmitter.

AUGUST LEIB.